United States Patent [19]

Brennan et al.

[11] Patent Number: 4,526,421
[45] Date of Patent: Jul. 2, 1985

[54] MULTI-PASSENGER AIRCRAFT SEAT HAVING COMPOSITE PANEL FRAME

[75] Inventors: Edward J. Brennan, Litchfield; William A. Long, Harwinton; René J. Brunelle, Wolcott, all of Conn.

[73] Assignee: PTC Aerospace Inc., Bantam, Conn.

[21] Appl. No.: 429,340

[22] Filed: Sep. 30, 1982

[51] Int. Cl.³ .............................................. A47C 15/00
[52] U.S. Cl. .................................. 297/232; 297/243; 297/DIG. 2; 297/457; 297/460; 297/458; 297/216; 428/73; 108/51.3; 108/901
[58] Field of Search ............... 297/183, 122, 232, 243, 297/248, 355, 317, 457, 458, 450, DIG. 2, 455, 460, 716; 108/51.3, 901; 428/73

[56] References Cited

U.S. PATENT DOCUMENTS

| | | | |
|---|---|---|---|
| 2,808,875 | 10/1957 | Bargen | 297/183 |
| 2,845,111 | 7/1958 | Barecki et al. | 297/232 X |
| 3,091,497 | 5/1963 | Houser | 297/450 |
| 3,468,582 | 9/1969 | Judd | 297/248 X |
| 3,910,632 | 10/1975 | Marechal | 297/232 |
| 4,061,812 | 12/1977 | Gilwee, Jr. et al. | 428/73 X |
| 4,205,879 | 6/1980 | Heling | 297/417 |
| 4,229,040 | 10/1980 | Howell et al. | 297/232 X |
| 4,296,967 | 10/1981 | Vogel | 297/452 X |
| 4,300,978 | 11/1981 | Whitemore et al. | 428/73 X |

Primary Examiner—William E. Lyddane
Assistant Examiner—Peter A. Aschenbrenner
Attorney, Agent, or Firm—Thomas K. McBride; William H. Page, II; Barry L. Clark

[57] ABSTRACT

Improved, lightweight multi-passenger aircraft seating unit utilizes an elongated, generally S-shaped, composite panel to provide the sole support for the seat cushions, the seat back and seat back tray table, the seat belt anchors and the armrests. Front legs and rear legs made of thin sheet metal can be attached directly to the panel by bolts passing through the panel. A downwardly projecting front portion of the panel and an upwardly projecting rear portion, in cooperation with channel-shaped members bonded to the panel's peripheral edges, enhance the rigidity of the panel. The unit provides cantilever support without the necessity for the front and rear tubular stretcher members and the fore and aft support members used in conventional seats. The composite panel has a honeycomb core and its top and bottom skin surfaces are formed of continuous layers of resin-impregnated fibrous material such as graphite fibers, with additional swatches of such material overlying and integrally bonded into the skin. The additional reinforcement material is laminated into regions of additional stress such as those where the legs, back, seat belt anchors and armrests are to be attached. The seat back is doubly curved to provide lumbar and shoulder support and good comfort with a thin constant thickness rear pad. The seat allows spacing between seat rows to be determined virtually solely by the dimensions of the occupants.

18 Claims, 13 Drawing Figures

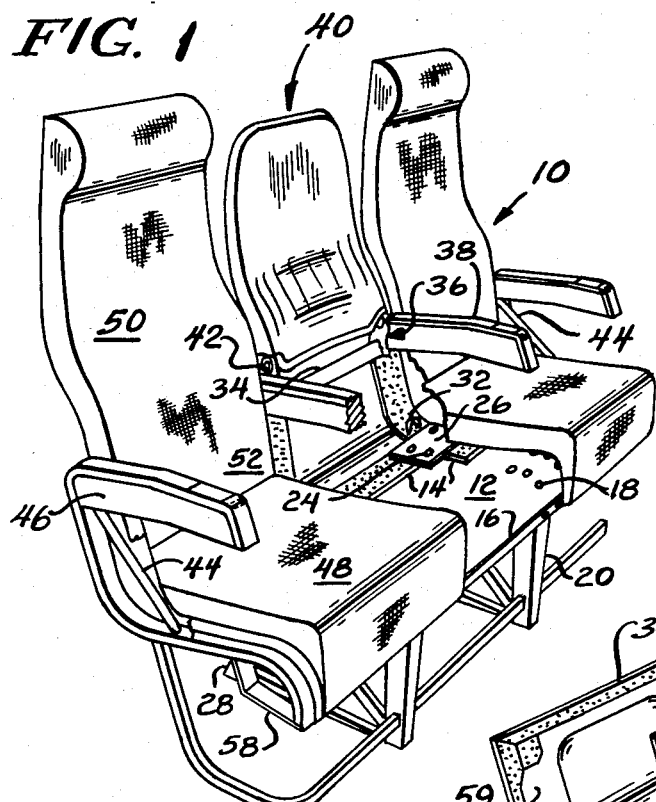
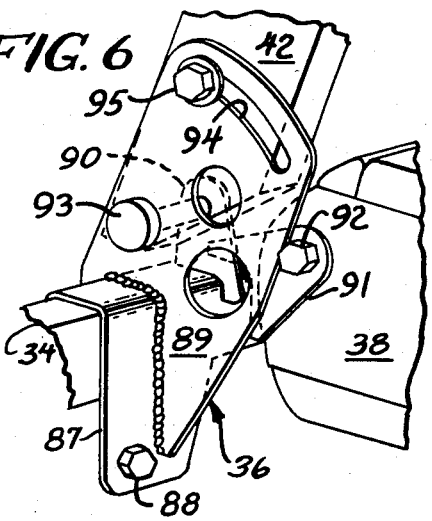
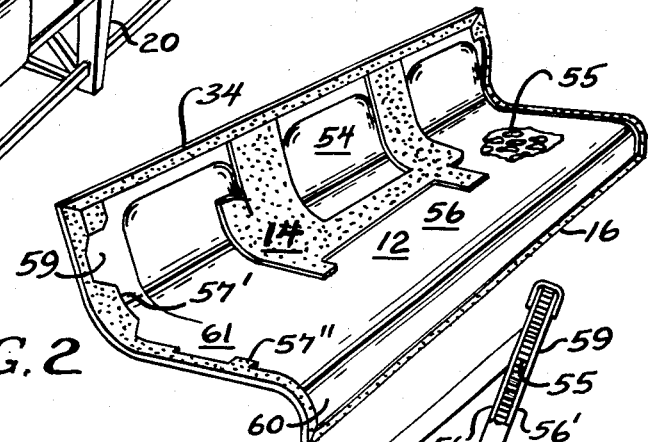
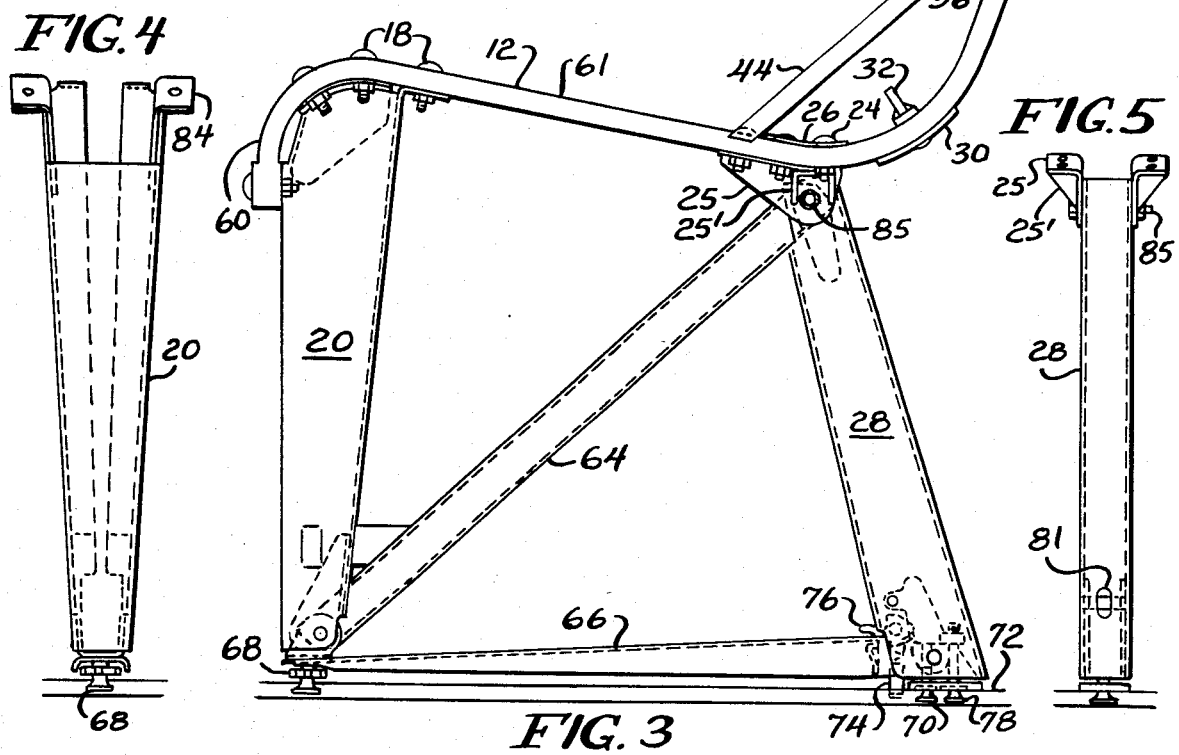

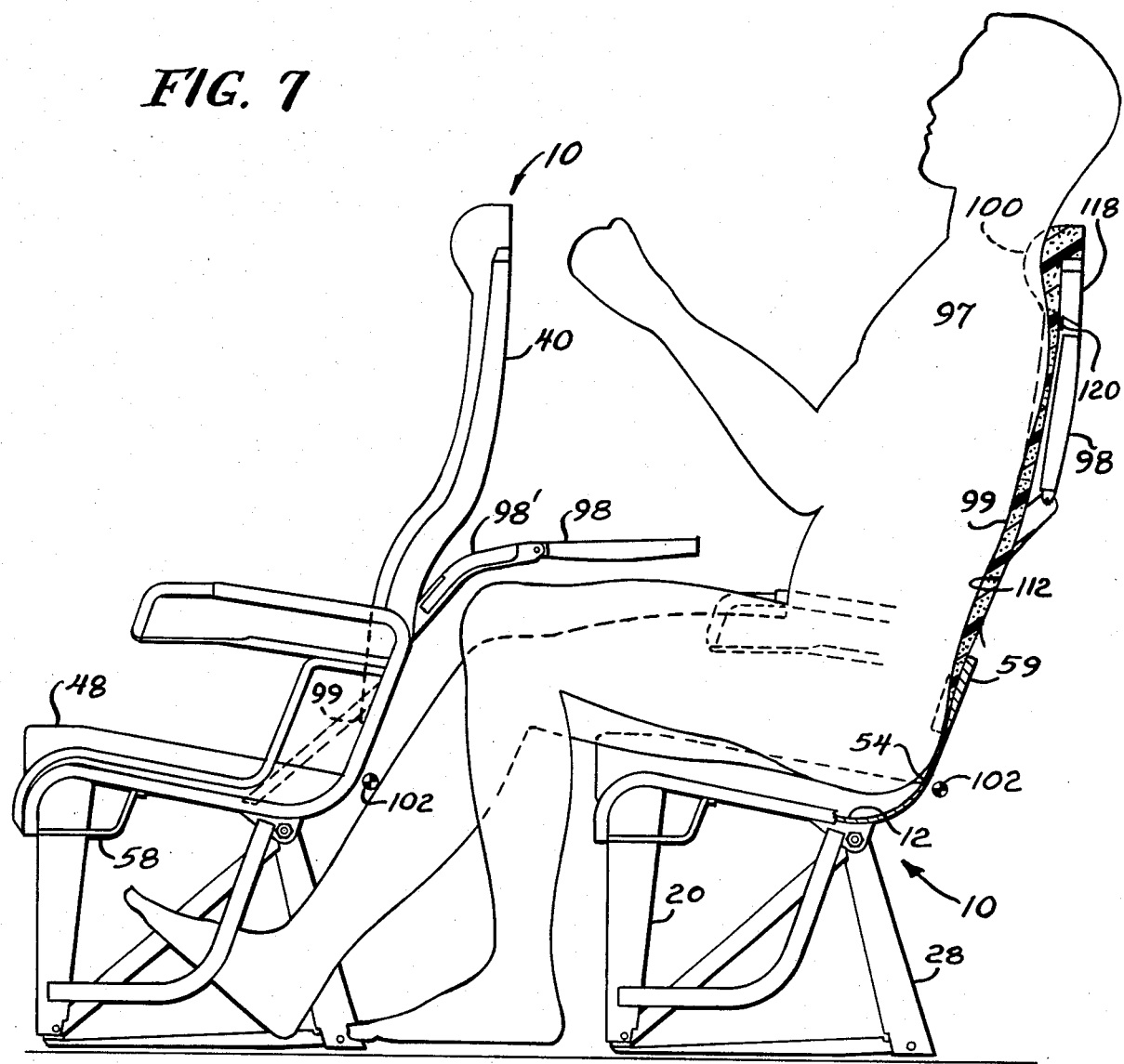
FIG. 7
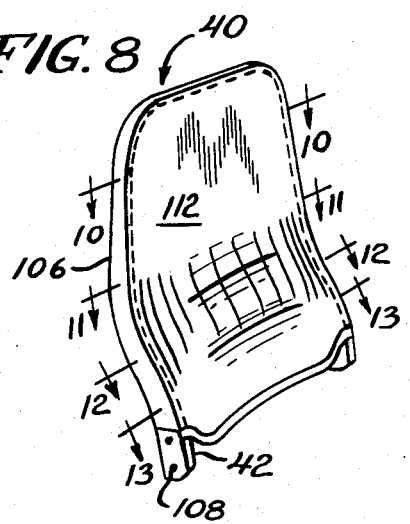
FIG. 8
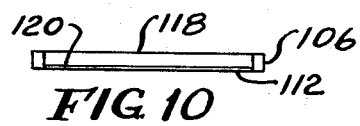
FIG. 10
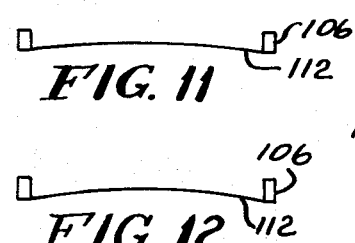
FIG. 11
FIG. 12
FIG. 13
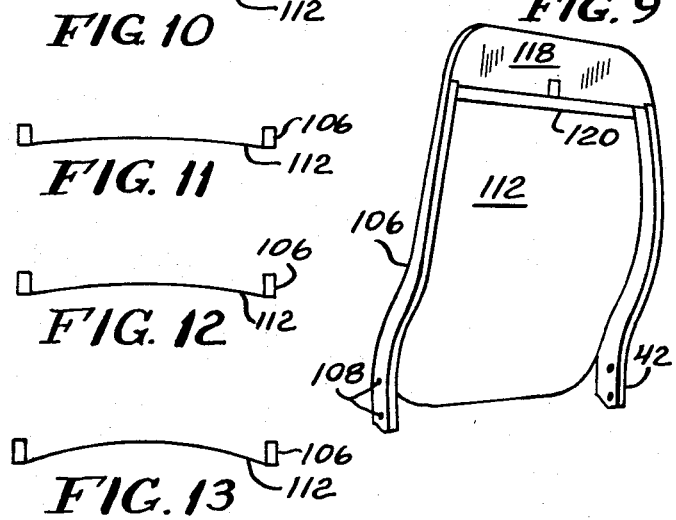
FIG. 9

MULTI-PASSENGER AIRCRAFT SEAT HAVING COMPOSITE PANEL FRAME

BACKGROUND OF THE INVENTION

The invention relates to vehicle seats and particularly to multi-passenger seats for aircraft. Of necessity, such seats must be capable of supporting the weight of several passengers and their luggage under acceleration loading conditions of 9 "g's" or more, while still being relatively light in weight. Typically, such seats include a frame comprising front and rear laterally positioned tubular metal "stretcher" members which are joined together by fore and aft members which are generally of forged aluminum. The front and rear legs are attached at their upper ends to the stretcher members and at their lower ends to a pair of slotted tracks in the aircraft floor. The seat backs, armrests, tray tables and seat belt anchors are normally attached to the fore and aft members. The seat cushions are supported between the stretcher members by diaphragm panels of nylon webbing of preforated metal and typically are of a composite construction consisting of open cell foam for comfort and closed cell foam for flotation. The cushion thickness and weight for a given level of comfort and flotation support can be minimized by sandwiching the open cell foam between relatively thin upper, lower, and peripheral layers of closed cell foam or by having only open cell foam in the entire center region and closed cell foam on the outer edges. Although improvements in materials have made it possible to greatly reduce the weight of certain components of the aforementioned seats, further improvements appear desirable in order to permit a substantial additional decrease in seat weight and thus of fuel consumption. In the field of seating for vehicles such as trains and buses, molded plastic seats such as shown in U.S. Pat. No. 4,088,367 have been used. However, such seats need have little strength compared to aircraft seats since the occupants are not restrained by seat belts, and thus their accelerated weight during a crash situation would not be transferred to their seat. U.S. Pat. No. 3,468,582 discloses a relatively heavy seat structure which incorporates a metal-skinned honeycomb panel but requires massive combined rear leg and fore and aft support members to support the panel and additional elongated metal ribs to support the seat back, arms and seat belt anchors.

SUMMARY OF THE INVENTION

It is among the objects of the present invention to provide a multi-passenger seating unit for an aircraft which is of substantially less weight than prior art heating units. It is a further object to provide such a unit which is of relatively simple construction and has many fewer parts than prior art units, thus reducing the costs of parts inventories and maintenance. A still further object is to provide a seat which is of such exceptional compactness that the pitch between rows can be determined virtually solely by the space required by the occupant's body. An additional object is to provide a seat having greater vertical underseat clearance than known prior art units.

The foregoing and other objects are attained by the seat frame and related elements of the present invention which is particularly characterized by a radically different type of construction. The seat frame includes a laterally elongated integral panel formed of a reinforced honeycomb composite with a generally constant thickness and an "S"-shaped cross-section. The reinforcement is preferably accomplished with relatively small pads or strips of advanced materials such as thermoset resin-impregnated graphite fiber cloth which are strategically positioned on the outer panel surfaces to provide additional strength and/or rigidity where it is particularly needed in order that the weight and cost of the panel can be kept as low as possible. The same advanced materials are also preferably used in a channel-shaped configuration to reinforce the panel edges and provide a mounting surface for elements to be attached to the panel. The S-shaped composite panel performs all of the functions of the prior art fore and aft stretcher members and the fore and aft members connecting them. It also replaces the individual seat bottom and lower back support panel or diaphragm members used on prior art seats. The S-shaped panel is preferably made by sandwiching a honeycomb panel having a flexible aluminum core between continuous upper and lower surface layers of thermoset resin-impregnated fibrous material. The honeycomb panel is preferably pre-crushed to reduce its thickness in the areas which are adapted to receive the buttocks of the seat occupants, thus allowing a minimum distance between rows of seats. Small swatches of "advanced composite" resin-impregnated cloth reinforcing materials, such as those that contain graphite fibers, are laid over the continuous layers of fibrous material in those areas, such as the attachment locations for the rear legs, the seat belt anchors, and the seat back and arms, where additional strength and rigidity is desired. The entire composite is then laminated and formed to its desired final shape under heat and pressure. Forming of the panel may be done against a die surface in either an autoclave or vacuum bag molding apparatus, for example. After curing is complete, excess edge material is trimmed away and separately formed edge covering U-shaped channels of advanced composite material are epoxy bonded to the panel. The edge channels increase the stiffness of the panel beyond that which is inherently provided by the upwardly extending rear flange and the downwardly extending front flange of the panel. They also provide mounting surfaces for the outer arms, the outer seat belt anchors, the end cap, an end brace and a flight attendant toe step.

The layers of reinforcement material which are laminated to opposed portions of the top and bottom surfaces of the composite panel are preferably of sufficient lateral width to accommodate the leg positioning and leg spacing requirements of various aircraft to permit the panel to accommodate varying amounts of loading applied in a cantilever fashion to its ends for a wide range of possible leg locations. When the panel is ready to have legs attached, a hole positioning template is positioned over the panel and the proper holes are formed. Since the front of the panel would experience downward compressive loads in a crash situation, it is possible to attach the front legs by merely placing a plurality of fasteners between the upper surface of the composite panel and the lower surface of flange portions which extend outwardly from the upper ends of the front legs. The rear legs would be in a tension mode in a crash and without additional reinforcement, would tend to have the heads of their retaining fasteners pull out of the composite panel since the panel is weakened in the areas where holes are drilled in it. To prevent this, a small metal plate is placed on top of the composite panel. The plate is drilled to accommodate the shanks of all of the fasteners for one of the rear legs and serves as a washer to spread the loading. Similar metal plates are placed under the panel to back up the fasteners for the seat belt anchor rings. For supporting the seat backs, tray tables and arms, metal brackets including a U-shaped channel portion are mounted to straddle both sides of the upper rear edge of the composite panel in regions in which vertically extending fibrous reinforcing materials have been bonded to the panel. To resist flexure of the composite panel, all of its edges have channel-shaped sections of resin-impregnated fibrous reinforcing material bonded to them, preferably with epoxy adhesive, after the basic panel is formed and trimmed to size. These sections seal the edges and rigidify the panel which must be sufficiently strong to support the passengers on the ends of the seat in a cantilever fashion. The reinforcing channels on the ends of the panel further rigidify the seat against rearward flexure and also provide a mounting surface for short metal tension bars which join the horizontal portion of the panel to the upwardly extending rear portion of the panel and provide additional restraint against flexure. The panel has been described as having surface layers of thermoset resin impregnated fibrous materials on opposed sides of a flexible core honeycomb panel. Although various fibrous materials, such as fibrous glass cloth and graphite fiber cloth can be used for the skin of the panel, other materials might also be suitable. Graphite fiber cloth, although far more expensive than fibrous glass, appears to provide excellent results in achieving the required strength and stiffness in a relatively thin and lightweight panel. Two layers of fibrous material, one with its fibers arranged at 45° and 135° to the front edge of the panel, and the other with its fibers at 0° and 90° appear to provide good stiffness. However, we have found it useful, in order to improve the bond between the honeycomb panel core and the inner fibrous layers, to place a film-like sheet of epoxy resin between these members. The resin sheet which preferably includes a light weave of fibers, melts or softens during the lamination process so that a resin-rich strong bond will exist between the panel's skin layers and its core. The bond is enhanced since the resin contacts a portion of the side walls of the cells in the honeycomb core. We prefer to use a 0.625" thick honeycomb core having very thin cell walls of aluminum as compared to a 0.500" core with slightly thicker walls since the greater thickness of the panel can provide more stiffness at less weight. Where the panel skins are made of fibrous glass, the panel will weigh more than with graphite fiber and will not be as stiff. It will, accordingly, require additional areas of reinforcement, such as longitudinal strips of graphite fiber cloth, in places such as where the front seat legs are attached. With present day materials costs and projected fuel costs, the use of graphite fibers for the skins appears to be more cost effective. The improved seating unit is disclosed primarily as a lightweight, non-reclining seat which will enable passengers to be positioned in reasonable comfort in a very high density tourist class seating configuration. The concept could, however, have its many advantages adapted to other classes of seating in which a higher degree of comfort is required. Besides very substantial weight savings, the principal advantage of the unit is its ability to permit a fore and aft pitch or spacing distance between rows of seats about 1.5" less than conventional seats that have upper rear stretcher members. Also, the underseat clearance of 12.375" is about 1–1.5" higher. The close pitch advantage is gained by molding the back of a graphite epoxy laminate so that it is not only very thin but so that it is progressively curved in two directions to provide support to a passenge's back and lumbar region exactly where it is needed. By molding the seat back shape to conform to the shape of the passenger, it is possible to provide a reasonable degree of softness and comfort with a relatively thin layer of foam having a constant thickness, such as 0.75". Furthermore, since a seated person does not need cushioning except where his torso is applying pressure to the seat, it is possible to reduce or eliminate cushioning in certain areas. For example, when a person is seated so that his lumbar region is firmly supported, no support is needed for the buttock region and in fact many molded and folding seats omit a portion of the seat back so that this region may extend rearwardly of the seat back. In the disclosed seating unit, the honeycomb core is precrushed in the buttocks receiving region before the panel is laminated. Furthermore, the seat back padding is relieved in the region below the lumbar area so that a seated passenger has the rearmost portion of his buttocks a considerable distance behind the front surface of the seat back cushion and separated only by a layer of upholstery cloth and by the thickness of the crushed panel from the knees of the passenger in the seat behind him.

BRIEF DESCRIPTION OF THE DRAWINGS

FIG. 1 is a perspective view of the improved multi-passenger seating unit with portions removed to expose the composite frame panel;

FIG. 2 is a perspective view of the reinforced composite frame panel;

FIG. 3 is a side elevation view illustrating the cooperation between the composite frame panel and the legs and other frame structure which support it during use;

FIG. 4 is a front elevation view of a front leg;

FIG. 5 is a rear elevation view of a rear leg;

FIG. 6 is an enlarged view showing the bracket connection between the panel, backrest and arm in FIG. 1;

FIG. 7 is a side view illustrating a pair of seats arranged at a 30" pitch spacing, showing their relationship to a 99th percentile adult male, the seat back of the rear seat being shown in cross-section through its center;

FIGS. 8 and 9 perspective views illustrating the front and back sides of the thin, lightweight seat back member which is integrally formed of advanced composite material; and FIGS. 10–13 are cross-sectional views taken on lines 10—10, 11—11, 12—12 and 13—13 of FIG. 8.

DETAILED DESCRIPTION OF THE DRAWINGS

FIG. 1 shows a perspective view of a triple seat position seating unit indicated generally at 10 with portions broken away to indicate the framing features of the invention. The generally S-shaped composite frame panel 12 can be seen as having reinforcement areas 14 located around the bottom and side portions of the center seating position. These areas would be identically positioned on the top and bottom surfaces and handle the loads exerted on the panel by the cantilevered end seats, the seatbacks, the armrests and the seatbelt anchors. The lower front edge of the panel has a reinforcement channel 16 bonded to it. Depending upon the position of the seat retaining floor tracks in the aircraft in which the seat is to be used, the front bolts 18 which retain the front legs 20 could be positioned in apertures drilled in the panel at laterally varying locations. The apertures would be formed using an appropriate template. The plurality of rear bolts 24 are shown as passing through a surface mounted back-up or washer plate 26 which spreads the load to the panel. These bolts retain a bracket 25, shown in FIG. 3, which mounts the rear legs 28. A somewhat similar washer or backup plate 30 would be bonded to the underside of the panel 12, as shown in FIG. 3, to support the seat belt anchor ring 32 and to permit the upwardly directed loads placed thereon to be spread over a large area of the panel 12. An upper edge reinforcing channel 34, which, like all reinforcements, is preferably formed of an advanced composite material and bonded to the panel, provides stiffness to the top of the panel and also helps to spread the load applied to the panel by the bracket member indicated generally at 36. Bracket 36 supports the pivotable center arm 38 and the backrest indicated generally at 40 which has its tubular frame lower end portions 42 attached to the bracket. The stability of the panel 12 against rearward deflection is enhanced by the end mounted diagonal braces 44. A pair of brackets (not shown) which are quite similar to the brackets 36 are mounted to the reinforced upper edge portion 34 of the panel to support the fixed outer arms 46. The aforementioned panel and backrest structures provide the complete support for the seat bottom cushions 48 and the back cushions 50. The back cushions are retained to the seat in the usual manner by means of upholstered dress covers 52 which are slipped down over the seat back and attached in the usual manner.

Referring to FIG. 2, the honeycomb core composite panel 12 is shown as it would appear after being molded and trimmed to size and after its channel-shaped edge portions 16, 34 and 57 are attached. A depressed region 54 is formed at the rear of the panel in the regions corresponding to each seat position. These regions are formed by crushing the flexible core honeycomb substrate panel 55 before it is bonded or laminated to its upper and lower skin surfaces 56, 56'. Although the surface reinforcement regions 14 are shown in the drawing as having some thickness above the skin surface 56 and are also shown as being differently textured, this treatment in the drawing has merely been done for clarity. In the actual manufacture of the composite panel 12, a bottom layer identical to 14 is placed in the mold. Then, the lower skin 56' comprising two layers of a resin-impregnated "pre-preg", such as ones of graphite fibers, is placed in the mold so that the directions of weave of each layer is at about 45° to the other. This placement provides maximum rigidity in the finished product. A thin, film-like layer of epoxy resin, which may include a light weave of reinforcing filaments, is then placed over the layers forming the skin 56'. At this point the flexible core honeycomb filament 55 is laid in the mold and, because of its flexible nature, conforms quite closely by gravity to the shape of the mold. An additional film-like layer of epoxy resin (not shown) is then placed over the core 55 and is covered with two additional pre-preg layers arranged with their weaves at right angles to form the upper skin 56. The upper reinforcement layer of advanced composite fibrous material 14 is then positioned in its desired location and the entire composite is then formed under heat and pressure to produce the finished panel 12. During the molding of the panel the resin in the film sheets next to the core member 55 will flow slightly into the hollow ends of the cells of the honeycomb to increase the strength of the bond between the honeycomb and the skin layers and also to increase the rigidity of the panel. During the forming operation, the resin in the various layers and in the surface reinforcement layers 14 will flow and cause the surface reinforcements 14 to blend in an almost indistinguishable manner into the skin layers. Following a trimming to size of the panel 12, the separately formed edge channels 16, 34 and the end channels 57 are attached to the panel by bonding, such as with epoxy cement. The end channels 57 are preferably formed with projecting pad portions such as 57' and 57" to provide reinforcement for the attachment to the panel of elements such as seat belt anchors and the flight attendant toe step element 58. As can be seen in FIGS. 1, 2 and 3, the panel 12 is of a generally "S"-shape in that it has an upwardly extending rear portion 59, a downwardly extending front portion 60 and an intermediate generally horizontal portion 61. The upwardly and downwardly extending flange portions 59, 60 greatly increase the ability of the panel to resist flexure when used in the cantilever fashion shown in FIG. 1. As previously discussed, the particular fibrous material used for the skin layers 56, 56' can vary depending upon the cost of the various materials and the degree of strength and rigidity of the panel which is required. Where relatively inexpensive fibrous glass materials are used, the panel would weigh more and it would usually be necessary to utilize additional regions of reinforcing material 14 and/or a thicker honeycomb core. By using an advanced composite material for the skins, such as epoxy coated graphite fibers, the weight of the panel can be lowered. Obviously, each pound of weight that is left out of an item placed in an aircraft will result in a reduction in the operating costs of the aircraft over the life of the particular item. Also, some aircraft are quite critical in the necessity to keep weight down in a particular section, such as the tail end, of the aircraft. Thus, it might be more cost effective to make graphite fiber seats for one aircraft and fibrous glass seats for another.

FIG. 3 shows the relationship between the panel member 12 and its underlying leg structure. A diagonal compression brace member 64 joins the lower end of the front leg 20 to the upper end of the rear leg 28 while a tension channel member 66 joins the bottom ends of each of the legs. A front track fitting 68 is attached to the front leg 20 and a rear track fitting 70 is attached to the rear leg 28. Each of these fittings is mounted in a slotted floor track indicated schematically by a pair of parallel lines 72. The rear fitting 70 includes a shear pin 74 which can be moved into and out of a retaining slot in the floor track by a manually actuated cam lever 76. The rear stud 78 of the fitting is preferably threaded so that it can be tightened into non-rattling engagement with the floor track by rotating its upper threaded shank end. Access for tightening is gained through elongated access hole 81 in the rear leg.

As seen in FIG. 4, the front leg 20 is formed of a box-like sheet metal construction. It is formed to be wider at its top than its bottom in order to increase its ability to resist side loads. Outwardly extending flanges 84 are welded to the leg at its top and secured by a plurality of fastener members 18 to the forward edge portion of the panel 12. The rear leg 28 is shown in FIG. 5 and can be seen as having a relatively narrow width so as to not unnecessarily encroach on the legroom or storage area under the seats. The rear legs are mounted by bolts 85 to the brackets 25 which are supported on the underside of panel 12 by bolts 24 and the washer plate 26. The bolt assemblies 85 also support the diagonal brace member 64. Gusset portions 25' on the sides of the brackets 25 increase their rigidity.

FIG. 6 shown a large view of the bracket member 36 which is adapted to be attached to the upper edge of the rear flange portion 59 of the panel 12. The bracket includes a U-shaped body portion 87 which overlies the edge reinforcement 34 and is attached through the panel by a bolt assembly 88. An extended flange portion 89 cooperates with a short flange portion 90 which is spaced from it to accommodate the tubular lower end portions 42 of the backrest 10. A third outer flange member 91 cooperates with a similar flange located in a mirror image relationship on an adjacent bracket 36 (not shown) which supports one side of an adjacent seat back. A bolt assembly 92 passes through the flanges 91 and the armrest 38 so that the armrest may be pivoted to and from a vertical storage position. A mounting pin 93 supports the lower end of the tubular seat back end portion 42 while a limited degree of pivotal movement of the backrest is permitted by the slot 94 and the tension bolt assembly 95. Although the seat back 40 which is shown is of a non-reclinable nature, it is preferably positioned so that it is tilted back a few degrees further than a normal seat back. The purposes of the slot 94 is to permit the seat back to be pushed forward when a load of approximately 35 pounds is applied to its upper end. This feature is of assistance in a crash situation in order to allow a passenger in the seat immediately to the rear to have his head move forward with the seat back, thus reducing the "g" force of the impact. By limiting the length of the slot 94, the possibility of having a very heavy occupant forcing a seat back down too far on the back of a very light occupant ahead of him can be prevented. However, if desired, the slot 94 can be made long enough to permit movement of the seat back to a full horizontal position. In such a position, the seat can be more easily handled when being stored or moved into and out of an aircraft. Furthermore, horizontal seat backs can be crawled over by passengers to reach an emergency exit more quickly in the event of a crash.

FIG. 7 shows the relationship of two seating units 10 which are positioned at a 30" pitch distance with the rear seat being shown as occupied by a 99th percentile man who is 75" tall and weighs 212 pounds. As can be seen, even such a large person still has clearance from the tray table 98, when deployed. Furthermore, the seats have sufficient fore and aft clearance that they would have the capability of being moved another inch or so closer together before the man's shin would contact the seat back in front of him. Since the seat back 40 is molded to a very special configuration so as to conform to the body of an average seat occupant, it is possible for the seat to provide good comfort even though the foam pad 95 in the seat back has a constant thickness of only about 0.750 inches for its entire length up to the point where the headrest pad 100 is placed. The symbol 102 represents the "seat reference point" of the seat structure. The seat reference point is commonly defined as the point of intersection taken on the center line of the seat, between the front of the seat back cushion and the top of the seat bottom cushion. As can be seen in the drawing, the theoretical seat reference point for the present seat is actually behind the seat. The point 102 for the front seat in FIG. 7 appears to be spaced behind a downward projection of the pad 99 into the bottom cushion 48. However, the pad 99, on the center line of the seat, is further back by the thickness of backrest frame 106, as seen in FIG. 13. This advantageous location of the seat reference point is achieved by the unique curvature of the backrest as well as by the omission of the seat back pad 99 in the buttock area of the seat and the placement of depressed regions 54 in the back of the panel. By moving the seat reference point behind the seat it is possible to place the seats closer together than conventional seats.

FIGS. 8 through 13 illustrate the special contoured construction of the backrest 40 which permits it to provide excellent support to the occupant and to allow a thin pad 99 to provide the comfort of much thicker pads on conventional seats. The backrest includes an inverted U-shaped hollow tubular frame portion 106 which is preferably formed of resin-impregnated graphite fibers molded around a removable core. Apertures 108 in the lower ends 42 of the tubular frame are adapted to be mounted on the bracket 36 by pin 93 and bolt assembly 95 (FIG. 6). The thin front panel portion 112 is also preferably formed of graphite fibers and is molded of a double curved configuration so as to have the cross-sectional profiles shown in FIGS. 10-13. The relatively flat surface at the top of the backrest provide good support for the occupant's shoulderblade area while the large curvature at the bottom which extends to an imaginary plane which includes the rear surfaces of the frame 106, supports the occupant's lumbar and kidney regions and thereby permits padding to be eliminated behind the occupant's buttocks so that he may be positioned as far back in the seat as possible. The rigidity of the upper portion of the backrest is provided by an upper back panel 118 which is preferably made of a composite material. The back panel 118 and the front panel 112 are preferably bonded to the tubular frame 106 in a compression molding operation which preferably takes place in a match metal die. A forwardly extending front flange portion 120 on the lower end of the rear panel 118 is bonded to the rear surface of the front panel 112 and further increases the stability of the back member.

The special double curved shape of the seat back 40 is produced in part by shaping the tubular frame 106 with the side profile shown in FIG. 8 and in the left portion of FIG. 7. By offsetting the top portion of the frame to the rear of the bottom portion, additional clearance is provided for the occupant's knees. By curving the panel 112 as shown in FIGS. 10-13, space is made available behind the panel 112 at its bottom for the tray table arms 98' which would be attached to the ends of pins 93. The tray table 98 then can be stored in the hollow area under the back panel 118 since the front panel 112 is not curved or only slightly curved in the area where the tray table is stored.

We claim as our invention:

1. A multi-passenger aircraft seating unit comprising an integral composite panel frame member having a laterally extending generally flat intermediate portion and generally vertically extending front and rear portions which extend downwardly and upwardly, respectively, from said intermediate portion; said composite panel frame member having a honeycomb core with upper and lower continuous skin surfaces of resin impregnated fibrous material bonded thereto, said continuous skin surfaces having additional layers of resin-impregnated fibrous reinforcing material bonded thereto and overlying portions of said skin surfaces in spaced regions thereof to enhance the resistance of the panel to flexure and to reinforce the panel at locations where other elements of the seating unit are to be attached to it; a pair of front legs and a pair of rear legs attached to said panel frame member at spaced locations relative to each other; said panel frame member comprising the sole fore and aft structural frame element between any and all of said spaced locations; seat cushion means positioned to overlie at least the flat intermediate portion of said panel frame member; bracket means mounted to fibrous material reinforced areas of said panel, and a plurality of backrests and armrests supported by said bracket means.

2. A multi-passenger seating unit in accordance with claim 1 wherein said panel frame member comprises the sole lateral structural frame element between any and all of said spaced locations.

3. A multi-passenger seating unit in accordance with claim 2 wherein the resin in said additional layers of resin impregnated fibrous reinforcing materials is integrally fused to the resin in the continuous skin surfaces which they overlie.

4. A multi-passenger seating unit in accordance with claim 1 wherein the rear portion of said composite panel frame member has its honeycomb core crushed toward its rear skin surface to form a plurality of depressed regions in its forward skin surface at spaced locations corresponding to the buttock regions of each of the seat occupants when the unit is occupied, thereby providing additional seating space for each occupant behind the general plane of the forward surface of said rear panel frame portion.

5. A multi-passenger seating unit in accordance with claim 4 wherein a foam pad overlies the forward surface of each of said backrests and at least the upper portion of the rear portion of said panel frame member.

6. A multi-passenger seating unit in accordance with claim 5 wherein said foam pads have their lower ends spaced from said seat cushion means so that said depressed regions are not covered by said foam pads or by said seat cushion means over a substantial portion of their vertical extent.

7. A multi-passenger seating unit in accordance with claim 1 wherein each of said backrests comprises a panel portion which is integral with a tubular, generally inverted U-shaped frame which is attached at its free ends to said bracket means, said panel portion of said backrest comprising a thin sheet of resin impregnated fibrous material integrally bonded on its outer edges to the forward surface of said inverted U-shaped frame, said panel portion being progressively curved to a lesser and lesser extent as viewed in a series of horizontal cross-sections taken through said backrest in an upward direction from the bottom edge thereof, with said panel portion having its vertical center line at least approximately flush with an imaginary plane connecting the rear surfaces of said inverted U-shaped frame near the bottom of said backrest and at least approximately flush with an imaginary plane connecting the forward surfaces of said inverted U-shaped frame near the top of said backrest.

8. A multi-passenger seating unit in accordance with claim 7 wherein said backrest panel portion has a foam pad of uniform thickness attached to its front surface over its entire vertical extent except in its upper head rest region.

9. A multi-passenger seating unit in accordance with claim 8 wherein said foam pad has a thickness of about 0.75".

10. A multi-passenger seating unit in accordance with claim 7 wherein said generally inverted U-shaped frame has a side edge profile which extends generally vertically near its bottom and near its top but is curved rearwardly in an intermediate region so that the upper portion of the frame is rearwardly offset from but generally parallel to the bottom portion, said offset upper portion being located so as to be above the location of the knees of a seated occupant seated behind the seating unit.

11. A multi-passenger seating unit in accordance with claim 2 wherein at least one of said front legs and at least one of said rear legs is attached to said panel frame member at a location which is spaced from the end of said panel frame member by a distance such that all of one end seat position or at least most of the lateral extent of said one end seat position is supported in a cantilever fashion.

12. A multi-passenger seating unit in accordance with claim 1 wherein the bracket means for supporting said backrests include curved slot portions engaged by tensioned fasteners on said backrests, said curved slots permitting said backrests to be moved forwardly when a substantial load is applied to the upper portion of their rear side.

13. A multi-passenger seating unit in accordance with claim 11 wherein said seat legs may be attached to said panel frame member at varying distances from the end of said panel frame member to accommodate varying lateral positions of floor tracks with which the seating unit may be used.

14. A multi-passenger seating unit in accordance with claim 1 wherein said front legs have outwardly extending apertured flange portions at their tops which are mounted to said panel frame member by a plurality of fasteners which engage the top of said panel frame member.

15. A multi-passenger seating unit in accordance with claim 14 wherein said rear legs are pivoted to an apertured flanged bracket which is mounted to said panel frame member by a plurality of fasteners, said last named plurality of fasteners having a reinforcing plate positioned under their heads on the top side of the panel frame member.

16. A multi-passenger seating unit in accordance with claim 1 wherein an inverted U-shaped seat belt anchor is mounted to said panel frame member adjacent each seat position by a pair of threaded nuts but have reinforcing plates between the nuts and the lower skin of the panel frame member.

17. A multi-passenger seating unit in accordance with claim 1 wherein said additional layers of reinforcing material include a plurality of channel-shaped elements overlying all of the edges of the panel frame member and flat cloth layers overlying at least portions of the intermediate and rear portions of the panel frame member in the region surrounding the center seat portions of said seating unit.

18. A multi-passenger seating unit in accordance with claim 7 wherein the upper portion of the rear portion of the panel frame member and the lower portion of the panel portion of the backrest are located at a sufficient distance above the seat cushion means so as to support the lumbar region of an average-sized seat occupant.

* * * * *